(12) United States Patent
Kawasaki

(10) Patent No.: US 12,718,985 B2
(45) Date of Patent: Aug. 25, 2026

(54) MULTILAYER CERAMIC CAPACITOR INCLUDING EXTENDED DIELECTRIC PORTION

(71) Applicant: Murata Manufacturing Co., Ltd., Nagaokakyo (JP)

(72) Inventor: Junichi Kawasaki, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 105 days.

(21) Appl. No.: 18/739,374

(22) Filed: Jun. 11, 2024

(65) Prior Publication Data

US 2025/0014827 A1 Jan. 9, 2025

(30) Foreign Application Priority Data

Jul. 7, 2023 (JP) ................................. 2023-112326

(51) Int. Cl.

| | |
|---|---|
| ***H01G 4/224*** | (2006.01) |
| ***H01G 4/012*** | (2006.01) |
| ***H01G 4/30*** | (2006.01) |
| *H01G 4/12* | (2006.01) |
| *H01G 4/232* | (2006.01) |

(52) U.S. Cl.

CPC ............ *H01G 4/224* (2013.01); *H01G 4/012* (2013.01); *H01G 4/30* (2013.01); *H01G 4/12* (2013.01); *H01G 4/2325* (2013.01)

(58) Field of Classification Search

None

See application file for complete search history.

(56) References Cited

U.S. PATENT DOCUMENTS

| | | | | |
|---|---|---|---|---|
| 5,144,527 | A * | 9/1992 | Amano | H01G 13/06 361/309 |
| 2006/0214263 | A1* | 9/2006 | Kojima | H01G 4/30 257/532 |
| 2011/0157765 | A1* | 6/2011 | Kim | H01G 4/01 29/25.03 |
| 2012/0229949 | A1 | 9/2012 | Kim | |
| 2013/0063862 | A1* | 3/2013 | Kim | H01G 4/30 156/182 |
| 2016/0027584 | A1* | 1/2016 | Hattori | H01G 4/224 361/301.4 |
| 2017/0076870 | A1 | 3/2017 | Noda et al. | |
| 2019/0189352 | A1 | 6/2019 | Yamato et al. | |
| 2019/0221368 | A1 | 7/2019 | Ono et al. | |
| 2022/0102078 | A1* | 3/2022 | Kitahara | H01G 4/224 |
| 2024/0186067 | A1* | 6/2024 | Jung | H01G 4/30 |

FOREIGN PATENT DOCUMENTS

| | | | |
|---|---|---|---|
| JP | 2012-191159 | A | 10/2012 |
| JP | 2017-59633 | A | 3/2017 |
| JP | 2017-59820 | A | 3/2017 |
| JP | 2019-110158 | A | 7/2019 |
| JP | 2019-125705 | A | 7/2019 |

* cited by examiner

*Primary Examiner* — Eric W Thomas

(74) *Attorney, Agent, or Firm* — Keating & Bennett, LLP

(57) ABSTRACT

A multilayer ceramic capacitor includes a multilayer body, and first and second external electrodes. The multilayer body further includes an extended dielectric portion extending from at least one of a first side margin portion and a second side margin portion to cover only a portion of an inner layer portion at at least one of a first end surface and a second end surface.

7 Claims, 5 Drawing Sheets

T
11
14
12
32
31
W
15
16
13
10
E
20
41
42

T
11
14
12
32
31
W
15
10
20
41
42
22
16
13
23
21
22

MULTILAYER CERAMIC CAPACITOR INCLUDING EXTENDED DIELECTRIC PORTION

CROSS REFERENCE TO RELATED APPLICATIONS

This nonprovisional application is based on Japanese Patent Application No. 2023-112326, filed on Jul. 7, 2023, with the Japan Patent Office, the entire contents of which are hereby incorporated herein by reference.

BACKGROUND OF THE INVENTION

1. Field of the Invention

The present invention relates to multilayer ceramic capacitors.

2. Description of the Related Art

As a prior document, Japanese Patent Laid-Open No. 2019-110158 discloses a configuration of a multilayer ceramic capacitor. The multilayer ceramic capacitor described in Japanese Patent Laid-Open No. 2019-110158 includes a capacitance forming portion and a protective portion. The capacitance forming portion includes a plurality of internal electrodes stacked in a first direction and having in a second direction orthogonal to the first direction end portions aligned in the second direction with one another within a range of 0.5 μm. The protective portion covers the capacitance forming portion in the first and second directions.

In recent years, multilayer ceramic capacitors have been increasingly reduced in size and increased in capacity. Therefore, while the multilayer ceramic capacitor has a smaller geometry, an internal electrode corresponding to the geometry occupies area at an increased ratio. As a result, a plurality of stacked internal electrode layers are laterally sandwiched by a dielectric body reduced in thickness, and this allows moisture intruding through an interface between the dielectric body and an external electrode to easily reach the internal electrode layers, resulting in the multilayer ceramic capacitor having reduced moisture resistance.

SUMMARY OF THE INVENTION

Example embodiments of the present invention provide multilayer ceramic capacitors that each reduce or prevent a reduction in moisture resistance.

A multilayer ceramic capacitor according an example embodiment of the present invention includes a multilayer body, a first external electrode, and a second external electrode. The multilayer body includes a plurality of dielectric layers and a plurality of internal electrode layers that are alternately stacked in a layer stacking direction. The multilayer body includes a first major surface and a second major surface opposite to each other in the layer stacking direction, a first side surface and a second side surface opposite to each other in a widthwise direction orthogonal or substantially orthogonal to the layer stacking direction, and a first end surface and a second end surface opposite to each other in a lengthwise direction orthogonal or substantially orthogonal to both the layer stacking direction and the widthwise direction. The first external electrode is provided on the first end surface. The second external electrode is provided on the second end surface. The plurality of internal electrode layers include a first internal electrode layer connected to the first external electrode and a second internal electrode layer connected to the second external electrode. The multilayer body includes an inner layer portion, a first outer layer portion, a second outer layer portion, a first side margin portion, and a second side margin portion. In the inner layer portion, the first and second internal electrode layers include portions, respectively, opposing each other and stacked in the layer stacking direction to generate a capacitance. The first outer layer portion is located on a side of the inner layer portion adjacent to the first major surface in the layer stacking direction. The second outer layer portion is located on a side of the inner layer portion adjacent to the second major surface in the layer stacking direction. The first side margin portion is located on a side of the inner layer portion adjacent to the first side surface in the widthwise direction. The second side margin portion is located on a side of the inner layer portion adjacent to the second side surface in the widthwise direction. The multilayer body further includes an extended dielectric portion extending from at least one of the first and second side margin portions to cover only a portion of the inner layer portion at at least one of the first and second end surfaces.

Example embodiments of the present invention are each able to reduce or prevent a reduction in moisture resistance of a multilayer ceramic capacitor.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
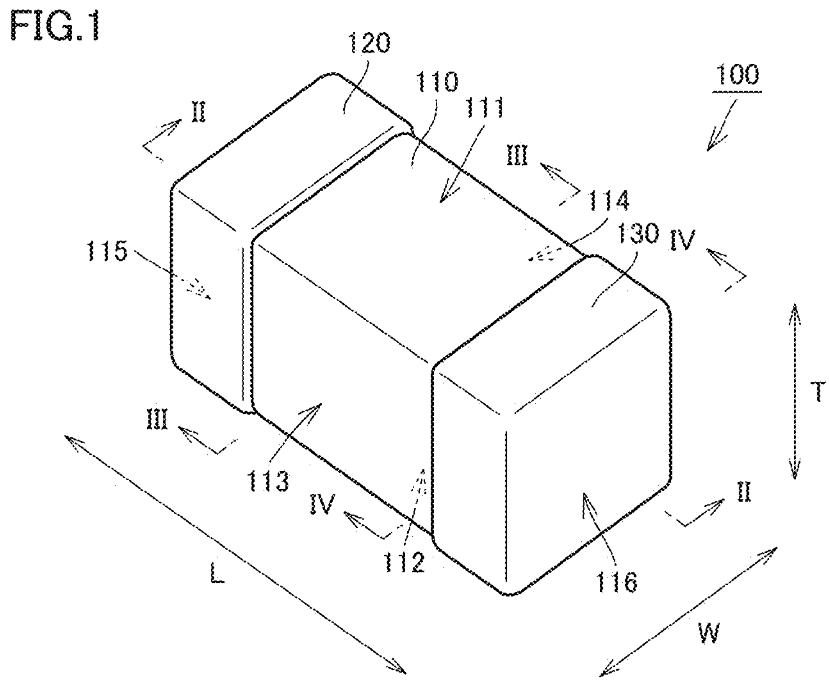
FIG. 1 is a perspective view of an appearance of a multilayer ceramic capacitor according to an example embodiment of the present invention.

Hereinafter, multilayer ceramic capacitors according to example embodiments of the present invention will be described with reference to the drawings. In the drawings, the same or equivalent components will be denoted by the same reference characters, and will not be described repeatedly in the following description of the example embodiment.

Figure 2:
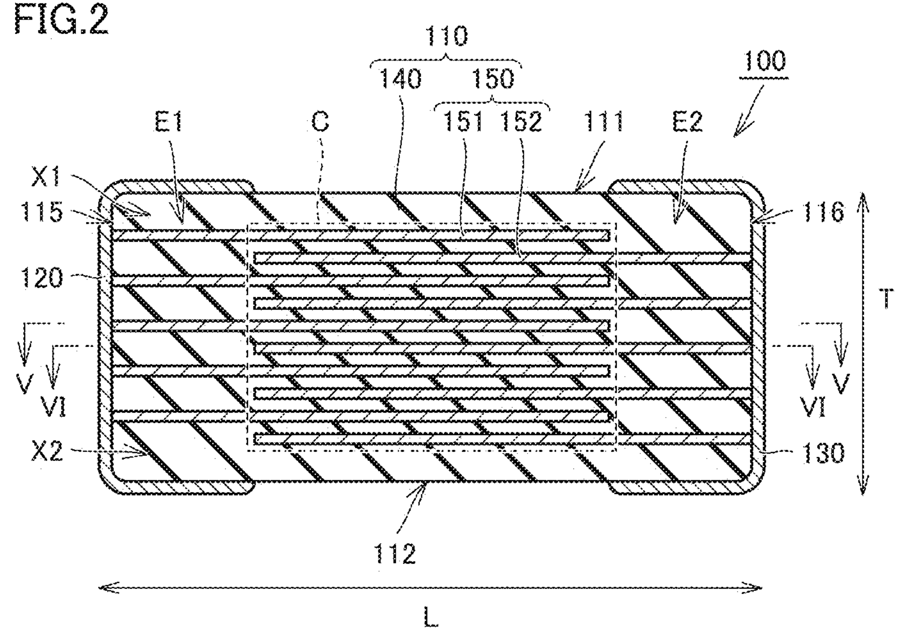
FIG. 2 is a cross section of the multilayer ceramic capacitor of FIG. 1 as seen in the direction of an arrow II-II.
Figure 3:
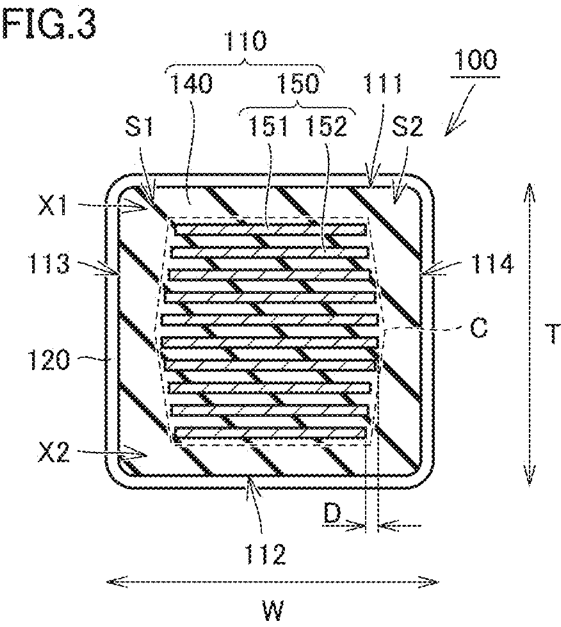
FIG. 3 is a cross section of the multilayer ceramic capacitor of FIG. 1 as seen in the direction of an arrow III-III.
Figure 4:
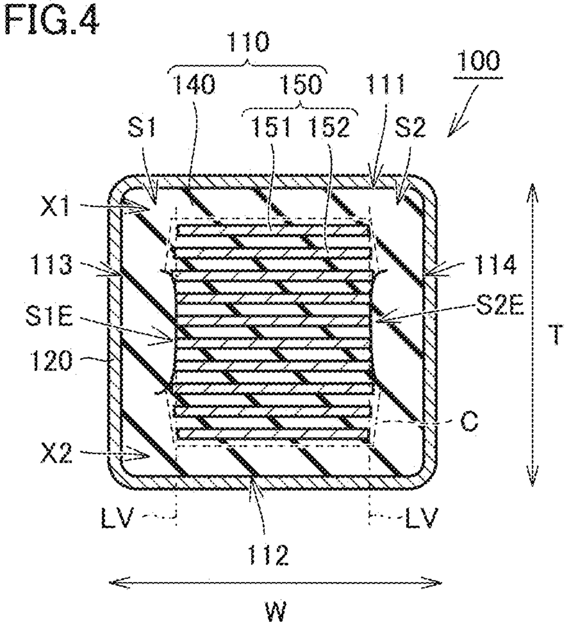
FIG. 4 is a cross section of the multilayer ceramic capacitor of FIG. 1 as seen in the direction of an arrow IV-IV.
Figure 5:
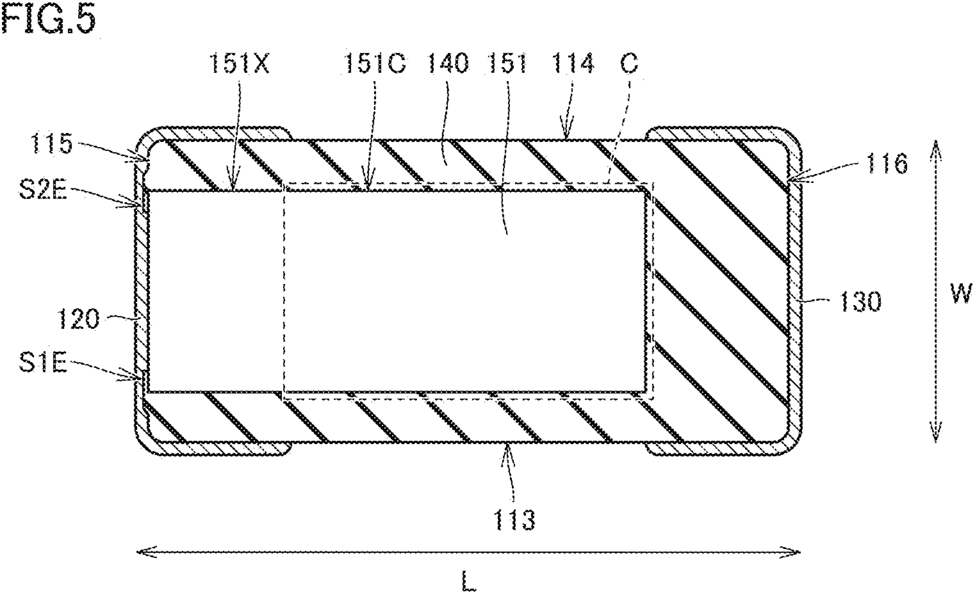
FIG. 5 is a cross section of the multilayer ceramic capacitor of FIG. 2 as seen in the direction of an arrow V-V.
Figure 6:
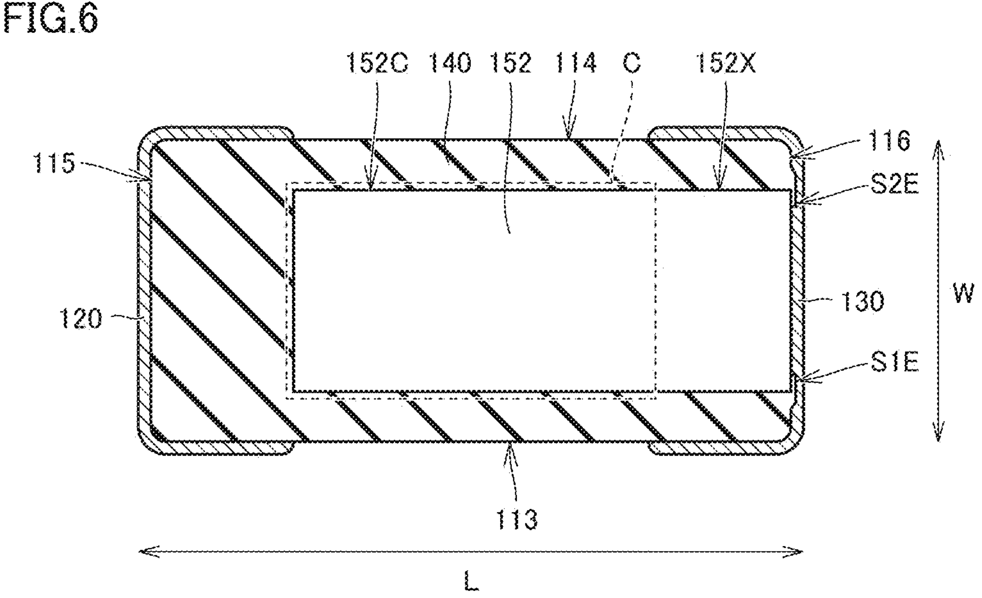
FIG. 6 is a cross section of the multilayer ceramic capacitor of FIG. 2 as seen in the direction of an arrow VI-VI.

FIG. 1 is a perspective view of an appearance of a multilayer ceramic capacitor according to an example embodiment of the present invention. FIG. 2 is a cross section of the multilayer ceramic capacitor of FIG. 1 as seen in the direction of an arrow II-II. FIG. 3 is a cross section of the multilayer ceramic capacitor of FIG. 1 as seen in the direction of an arrow III-III. FIG. 4 is a cross section of the multilayer ceramic capacitor of FIG. 1 as seen in the direction of an arrow IV-IV. FIG. 5 is a cross section of the multilayer ceramic capacitor of FIG. 2 as seen in the direction of an arrow V-V. FIG. 6 is a cross section of the multilayer ceramic capacitor of FIG. 2 as seen in the direction of an arrow VI-VI. In FIGS. 1 to 6, a multilayer body, which will be described hereinafter, has a length in a direction L and a width in a direction W, and has layers stacked in a direction T.

As shown in FIGS. 1 to 6, a multilayer ceramic capacitor 100 according to an example embodiment of the present invention includes a multilayer body 110, a first external electrode 120, and a second external electrode 130. The multilayer body 110 includes a plurality of dielectric layers 140 and a plurality of internal electrode layers 150 alternately stacked in layer stacking direction T.

Multilayer body 110 includes a first major surface 111 and a second major surface 112 opposite to each other in layer stacking direction T, a first side surface 113 and a second side surface 114 opposite to each other in widthwise direction W orthogonal or substantially orthogonal to layer stacking direction T, and a first end surface 115 and a second end surface 116 opposite to each other in lengthwise direction L orthogonal or substantially orthogonal to both layer stacking direction T and widthwise direction W. First external electrode 120 is provided on first end surface 115. Second external electrode 130 is provided on second end surface 116.

The plurality of internal electrode layers 150 include a plurality of first internal electrode layers 151 connected to first external electrode 120 and a plurality of second internal electrode layers 152 connected to second external electrode 130. Although FIGS. 2 to 4 show an example in which five first internal electrode layers 151 and five second internal electrode layer 152 are provided, first and second internal electrode layers 151 and 152 are not limited in number to five layers each and may also be any desirable number of layers.

As shown in FIG. 5, first internal electrode layer 151 includes an opposing portion 151C that opposes second internal electrode layer 152, and a lead portion 151X that is led out to first end surface 115. As shown in FIG. 6, second internal electrode layer 152 includes an opposing portion 152C that opposes first internal electrode layer 151, and a lead portion 152X that is led out to second end surface 116.

As shown in FIGS. 2 to 6, multilayer body 110 is sectionalized by an inner layer portion C, a first outer layer portion X1 and a second outer layer portion X2, a first side margin portion S1 and a second side margin portion S2, and a first end margin portion E1 and a second end margin portion E2.

Inner layer portion C includes first and second internal electrode layers 151 and 152 with their respective opposing portions 151C and 152C stacked in layers in layer stacking direction T to generate a capacitance. First outer layer portion X1 is located on a side of inner layer portion C adjacent to first major surface 111 in layer stacking direction T. Second outer layer portion X2 is located on a side of inner layer portion C adjacent to second major surface 112 in layer stacking direction T.

First side margin portion S1 is located on a side of inner layer portion C adjacent to first side surface 113 in widthwise direction W. Second side margin portion S2 is located on a side of inner layer portion C adjacent to second side surface 114 in widthwise direction W. First end margin portion E1 is located on s side of inner layer portion C adjacent to first end surface 115 in lengthwise direction L. Second end margin portion E2 is located on a side of inner layer portion C adjacent to second end surface 116 in lengthwise direction L.

Multilayer body 110 preferably includes rounded corners and ridges. As referred to herein, a corner is a portion where three surfaces of multilayer body 110 meet, and a ridge is a portion where two surfaces of multilayer body 110 meet.

Dielectric layer 140 located in inner layer portion C preferably has a thickness of, for example, about 0.4 μm or more and about 0.8 μm or less. Further, first and second outer layer portions X1 and X2 preferably each have a thickness of, for example, about 10 μm or more and about 30 μm or less. Dielectric layer 140 located in inner layer portion C has the thickness as a dimension at a central portion of multilayer body 110 in widthwise direction W, and so do first and second outer layer portions X1 and X2.

The plurality of dielectric layers 140 each include dielectric grains having a perovskite structure such as, for example, $BaTiO_3$, $CaTiO_3$, $SrTiO_3$ or $CaZrO_3$ as a major ingredient. The plurality of dielectric layers 140 may each include in the above major ingredient a subordinate ingredient of, for example, at least one of a Si compound, a Mg compound, a Mn compound, a Fe compound, a Cr compound, a Ni compound, and a Co compound contained in an amount smaller than that of the major ingredient.

First and second side margin portions S1 and S2 are preferably made of a dielectric ceramic material containing a Ba and Ti-containing perovskite compound as a major ingredient, for example. First and second side margin portions S1 and S2 may be made of the same dielectric ceramic material as the plurality of dielectric layers 140, or may be made of a dielectric ceramic material different than the plurality of dielectric layers 140.

First and second side margin portions S1 and S2 may include, for example, at least one of Si and Mg. First and second side margin portions S1 and S2 may include Mn.

First and second internal electrode layers 151 and 152 each preferably include, for example, one type of metal selected from Ni, Cu, Ag, Pd or Au, or an alloy including the metal. First and second internal electrode layers 151 and 152 may further include dielectric grains of the same type in composition as a ceramic material included in dielectric layer 140. In addition, Sn may be present at an interface between each of first and second internal electrode layers 151 and 152 and dielectric layer 140.

First and second internal electrode layers 151 and 152 preferably each have a thickness of, for example, about 0.4 μm or more and about 0.8 μm or less. Internal electrode layers 150 including first and second internal electrode layers 151 and 152 are preferably, for example, 90 or more and 900 or less internal electrode layers.

Dielectric layer 140, first and second internal electrode layers 151 and 152 can be measured in thickness in the following method.

Initially, multilayer body 110 is ground to expose a plane thereof defined by layer stacking direction T and widthwise direction W of multilayer body 110, that is, a plane thereof orthogonal to lengthwise direction L, and the exposed cross section is observed with a scanning electron microscope. Subsequently, dielectric layer 140 is measured in thickness on a center line passing through a center of the exposed cross section and extending in layer stacking direction T and two lines drawn on either side equidistantly from the center line for a total of five lines. An average value of these five measured values serves as the thickness of dielectric layer 140.

First and second internal electrode layers 151 and 152 can also each be measured in thickness in a method similar to the method for measuring the thickness of dielectric layer 140, in the same cross section as that in which the thickness of dielectric layer 140 is measured, with a scanning electron microscope.

First external electrode 120 is formed on the entirety of first end surface 115 of multilayer body 110 and is also formed to wrap around multilayer body 110 from first end surface 115 to first major surface 111, second major surface 112, first side surface 113, and second side surface 114. First external electrode 120 is electrically connected to first internal electrode layer 151.

Second external electrode 130 is formed on the entirety of second end surface 116 of multilayer body 110 and is also formed to wrap around multilayer body 110 from second end surface 116 to first major surface 111, second major surface 112, first side surface 113, and second side surface 114. Second external electrode 130 is electrically connected to second internal electrode layer 152.

First and second external electrodes 120 and 130 preferably include, for example, an underlying electrode layer and a plating layer disposed on the underlying electrode layer. The underlying electrode layer includes at least one of layers such as, for example, a baked electrode layer, a resin electrode layer, and a thin film electrode layer.

The baked electrode layer is a layer including glass and metal, and may be a single layer or a plurality of layers. The baked electrode layer is preferably, for example, made of one type of metal selected from Ni, Cu, Ag, Pd or Au, or an alloy including that metal, and for example includes an alloy of Ag and Pd or the like.

The baked electrode layer is preferably formed by applying a conductive paste including glass and metal to multilayer body 110 and baking the conductive paste. The baking may be performed at the same time as multilayer body 110 is fired, or may be performed after multilayer body 110 is fired.

The resin electrode layer can be formed, for example, as a layer including conductive particles and a thermosetting resin. When forming the resin electrode layer, the baked electrode layer may not be formed and the resin electrode layer may directly be formed on the multilayer body. The resin electrode layer may be a single layer or a plurality of layers.

The thin film electrode layer is preferably, for example, a layer of about 1 μm or less in which metal particles are deposited, and can be formed in a known thin film forming method such as sputtering or vapor deposition, for example.

The plating layer disposed on the underlying electrode layer is preferably, for example, made of one type of metal selected from Ni, Cu, Ag, Pd or Au, or an alloy including that metal, and it includes for example of an alloy of Ag and Pd or the like. The plating layer may be a single layer or a plurality of layers. However, for example, the plating layer preferably has a two-layer structure in which a Sn plating layer is formed on a Ni plating layer. The Ni plating layer has a function to prevent the underlying electrode layer from being eroded by solder when mounting multilayer ceramic capacitor 100. The Sn plating layer has a function to improve solder wettability when mounting multilayer ceramic capacitor 100.

As shown in FIG. 3, at a central portion in lengthwise direction L, the plurality of internal electrode layers 150 are increased in width from an end portion toward a central portion in layer stacking direction T. As shown in FIG. 4, at an end portion in lengthwise direction L as well, the plurality of internal electrode layers 150 are increased in width from an end portion toward a central portion in layer stacking direction T.

This change in width of internal electrode layers 150 is attributed to a difference between the thermal shrinkage rate of each of first and second outer layer portions X1 and X2 and that of inner layer portion C when they are fired. Specifically, as inner layer portion C has a smaller thermal shrinkage rate than that of first and second outer layer portions X1 and X2 when they are fired, internal electrode layers 150 located at the central portion in layer stacking direction T have a larger width than internal electrode layers 150 located at the end portion in layer stacking direction T.

As illustrated in FIG. 3, in a cross section of multilayer body 110 parallel to layer stacking direction T and widthwise direction W at the central portion of multilayer body 110 in lengthwise direction L, the plurality of internal electrode layers 150 have a maximum offset amount D of, for example, about 5 μm or less in widthwise direction W. Specifically, of the plurality of internal electrode layers 150, internal electrode layer 150 located closest to first side surface 113 and internal electrode layer 150 located closest to second side surface 114 have maximum offset amount D of, for example, about 5 μm or less in widthwise direction W.

As shown in FIGS. 4 to 6, multilayer body 110 further includes an extended dielectric portion extending from at least one of first and second side margin portions S1 and S2 so as to cover only a portion of inner layer portion C at at least one of first and second end surfaces 115 and 116.

Specifically, an extended dielectric portion S1E extends from first side margin portion S1 so as to cover only a portion of inner layer portion C at at least one of first and second end surfaces 115 and 116. An extended dielectric portion S2E extends from second side margin portion S2 so as to cover only a portion of inner layer portion C at at least one of first and second end surfaces 115 and 116.

In the present example embodiment, extended dielectric portion S1E extends from first side margin portion S1 so as to cover only a portion of inner layer portion C at both first and second end surfaces 115 and 116. Extended dielectric portion S2E extends from second side margin portion S2 so as to cover only a portion of inner layer portion C at both first and second end surfaces 115 and 116. Extended dielectric portion S1E and extended dielectric portion S2E may not be shaped to be symmetrical to each other.

Extended dielectric portions S1E and S2E are located at least at a central portion in layer stacking direction T. Thus, end portions in widthwise direction W of internal electrode layers 150 located at the central portion in layer stacking direction T are covered with extended dielectric portions S1E and S2E. In the present example embodiment, the end portions in widthwise direction W of internal electrode layers 150 located in inner layer portion C in a range of, for example, about 30% or more and about 70% or less adjacent to the center in layer stacking direction T are covered with extended dielectric portions S1E and S2E. Extended dielectric portions S1E and S2E can be confirmed by grinding multilayer body 110 and thus exposing a plane thereof defined by lengthwise direction L and widthwise direction W of multilayer body 110, that is, a plane thereof orthogonal to layer stacking direction T of multilayer body 110, and observing the exposed cross section. Alternatively, extended dielectric portions S1E and S2E can be confirmed by grinding multilayer ceramic capacitor 100 on the side of the external electrode in lengthwise direction L.

As shown in FIG. 4, extended dielectric portions S1E and S2E extend into inner layer portion C within a range that does not exceed a line LV connecting an end portion in widthwise direction W of internal electrode layer 150 disposed closest to first major surface 111 and an end portion in widthwise direction W of internal electrode layer 150 closest to second major surface 112. This can prevent insufficient connection between first internal electrode layer 151 and first external electrode 120 and insufficient connection between second internal electrode layer 152 and second external electrode 130.

At least one of Si and Mg segregates in the plurality of internal electrode layers 150 at a portion covered at at least one of first and second end surfaces 115 and 116 with extended dielectric portions S1E and S2E. In the present example embodiment, at least one of Si and Mg also segregates in each of the plurality of internal electrode layers 150 at their end portions opposite in widthwise direction W. The segregation of Si and Mg can be confirmed by observing a cross section by SEM/EDX, for example.

The portion having segregation of at least one of Si and Mg has enhanced electrical insulation, and can thus prevent short circuit when internal electrode layers 150 adjacent to one another in layer stacking direction T have their respective ends in widthwise direction W close to one another. As a result, multilayer ceramic capacitor 100 can be enhanced in reliability.

Multilayer ceramic capacitor 100 has a dimension for example of about 0.1 mm or more and about 1.0 mm or less in lengthwise direction L. Multilayer ceramic capacitor 100 has a dimension for example of about 0.05 mm or more and about 0.5 mm or less in layer stacking direction T. Multilayer ceramic capacitor 100 has a dimension for example of about 0.05 mm or more and about 0.5 mm or less in widthwise direction W. The above dimensions include tolerances.

Hereinafter, an example of a method for manufacturing multilayer ceramic capacitor 100 according to the present example embodiment will be described.

In the method for manufacturing multilayer ceramic capacitor 100, initially, a ceramic slurry including ceramic powder, a binder, and a solvent is prepared. The ceramic slurry is formed into a sheet on a carrier film by using, for example, a die coater, a gravure coater, a microgravure coater, or the like, to produce an inner layer ceramic green sheet, an outer layer ceramic green sheet, and a side ceramic green sheet, which will be described hereinafter.

The outer layer ceramic green sheet and the side ceramic green sheet may be formed of a material similar to that of the inner layer ceramic green sheet, or may be formed of a material containing an ingredient different than a material of the inner layer ceramic green sheet. In the present example embodiment, for example, at least one of Si and Mg is added when the side ceramic green sheet is produced.

Subsequently, a conductive paste is applied on the inner layer ceramic green sheet by printing such as, for example, screen printing, inkjet printing, gravure printing, or the like so as to have a strip-shaped pattern to form a conductive pattern. The conductive paste preferably includes, for example, Ni powder, an organic solvent, a binder and the like.

A raw material sheet including the inner layer ceramic green sheet that will serve as dielectric layer 140 located in inner layer portion C and a conductive pattern, which will serve as internal electrode layer 150, printed on a surface of the inner layer ceramic green sheet, is prepared.

A plurality of such raw material sheets and the outer layer ceramic green sheet are stacked in layers. Specifically, the plurality of raw material sheets are stacked in layers such that inner layer ceramic green sheets have their respective strip-shaped conductive patterns facing in the same direction, with adjacent raw material sheets having their respective strip-shaped conductive patterns offset in the widthwise direction by about half a pitch. A plurality of outer layer ceramic green sheets are stacked in layers on those sides of the plurality of stacked raw material sheets which are opposite in the layer stacking direction.

The stacked outer layer ceramic green sheets and raw material sheets are thermocompression-bonded to form a mother block. The mother block is individualized into a plurality of multilayer chips with a press-cutting blade or the like.

Figure 7:
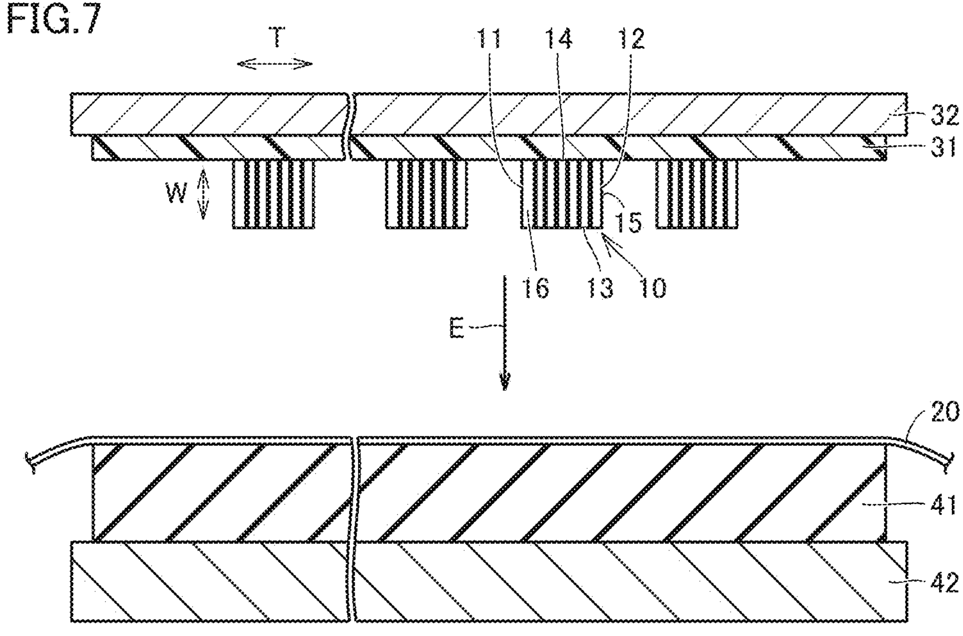
FIG. 7 is a schematic view showing a first sticking step to stick a side ceramic green sheet to a first side surface of each of a plurality of multilayer chips collectively according to an example embodiment of the present invention.

FIG. 7 is a schematic view showing a first sticking step to stick a side ceramic green sheet to the first side surface of each of a plurality of multilayer chips collectively.

As shown in FIG. 7, the plurality of multilayer chips 10 each include a first major surface 11, a second major surface 12, a first side surface 13, a second side surface 14, a first end surface 15, and a second end surface 16. First major surface 11 is a portion corresponding to first major surface 111 of multilayer body 110, and second major surface 12 is a portion corresponding to second major surface 112 of multilayer body 110. First side surface 13 is a portion corresponding to first side surface 113 of multilayer body 110, and second side surface 14 is a portion corresponding to second side surface 114 of multilayer body 110. First end surface 15 is a portion corresponding to first end surface 115 of multilayer body 110, and second end surface 16 is a portion corresponding to second end surface 116 of multilayer body 110.

In the first sticking step performed to stick the side ceramic green sheet to first side surface 13 of each of the plurality of multilayer chips 10 collectively, a side ceramic green sheet 20, which will serve as first side margin portion S1, is stuck to first side surface 13 of each of the plurality of multilayer chips 10.

Specifically, as shown in FIG. 7, a support plate 32 is located so that the plurality of multilayer chips 10 held by an expandable sheet 31 through adhesion have their first side surfaces 13 facing downward, and side ceramic green sheet 20 is provided below the plurality of multilayer chips 10 so as to face the plurality of multilayer chips 10.

Side ceramic green sheet 20 is on an elastic body 41 in a developed state, and elastic body 41 is placed on a stage 42. Subsequently, support plate 32 is lowered in a direction indicated in FIG. 7 by an arrow E.

Figure 8:
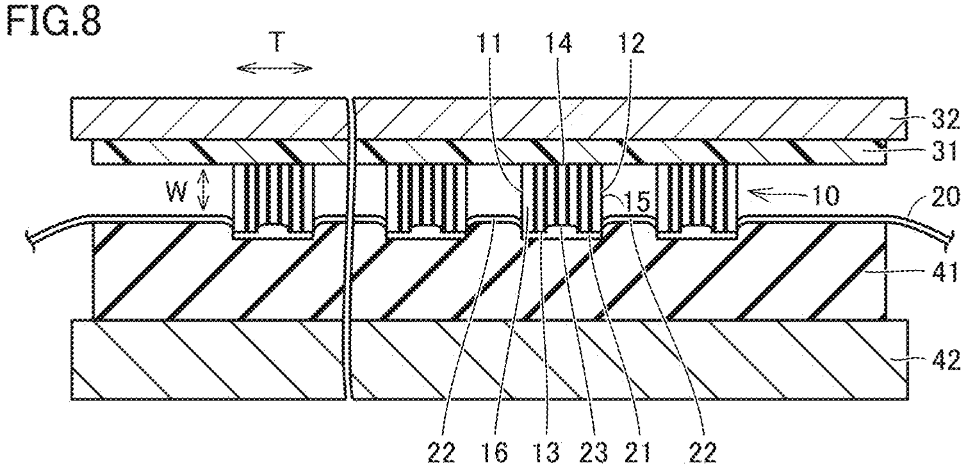
FIG. 8 is a schematic view showing the plurality of multilayer chips collectively pressed against the side ceramic green sheet.

FIG. 8 is a schematic view showing the plurality of multilayer chips collectively pressed against the side ceramic green sheet. As shown in FIG. 8, the plurality of multilayer chips 10 are collectively pressed against side ceramic green sheet 20. In doing so, the plurality of multilayer chips 10 are each pressed toward side ceramic green sheet 20 with such an extent of force that a portion of elastic body 41 that comes into contact with the plurality of multilayer chips 10 via side ceramic green sheet 20 is elastically deformed in a vicinity of that portion.

As a result, a portion of side ceramic green sheet 20 sandwiched between the plurality of multilayer chips 10 and elastic body 41 is compression-bonded to first side surface 13 of each of the plurality of multilayer chips 10 and a shearing force acts on side ceramic green sheet 20 at an edge portion of first side surface 13 of each of the plurality of multilayer chips 10 to punch out side ceramic green sheet 20.

Side ceramic green sheet 20 has a physical property adjusted so that when the side ceramic green sheet is punched out a shearing force generated by a corner of first side surface 13 is larger than a shearing force generated by a ridge of first side surface 13. For example, by adding an additive to increase side ceramic green sheet 20 in viscosity, a portion sheared by the ridge that provides a shearing force smaller the corner does is burred. As a result, side ceramic green sheet 20 at a portion sheared by the ridge of first side surface 13 includes a burred portion 23 formed to define and function as the extended dielectric portion.

That is, side ceramic green sheet 20 is divided into a punched portion 21 punched out by each of the plurality of multilayer chips 10 to serve as the side margin portion, burred portion 23 extending from a central portion of an edge of punched portion 21, and a remaining portion 22 remaining after the punching. Thereafter, support plate 32 is raised.

Figure 9:
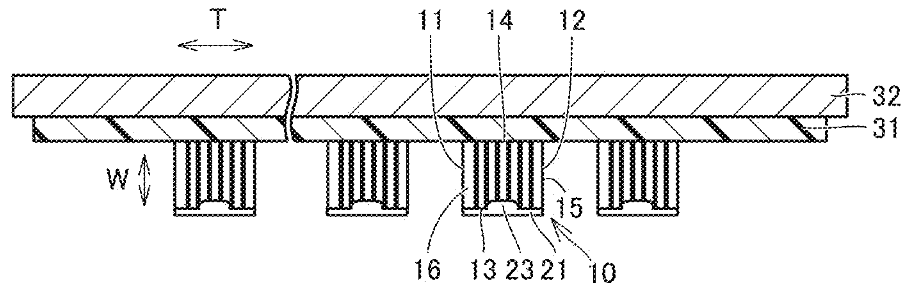
FIG. 9 is a schematic view showing the plurality of multilayer chips after the first sticking step is performed.

FIG. 9 is a schematic view showing the plurality of multilayer chips after the first sticking step is performed. As shown in FIG. 9, the plurality of multilayer chips 10 held by expandable sheet 31 through adhesion each have first side surface 13 covered with punched portion 21. Further, a portion of each of first and second end surfaces 15 and 16 adjacent to first side surface 13 is covered with burred portion 23.

In sticking side ceramic green sheet 20 to the plurality of multilayer chips 10, an adhesive (not shown) may be applied in advance to at least one of first side surfaces 13 of the plurality of multilayer chips 10 and a major surface of the side ceramic green sheet, as necessary. Examples of the adhesive that can be used include an adhesive containing a variety of types of resin ingredients as a major ingredient, an adhesive having the resin ingredient dissolved in a solvent, and a paste having ceramic particles dispersed therein. In addition, how the adhesive is applied is not particularly limited, and a variety of methods can be used to do so.

Figure 10:
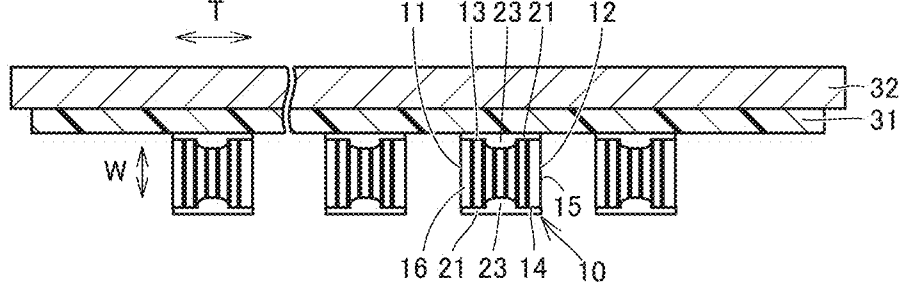
FIG. 10 is a schematic view showing the plurality of multilayer chips after a second sticking step is performed to stick a side ceramic green sheet to a second side surface of each of the plurality of multilayer chips collectively.

Subsequently, a second sticking step is performed to stick side ceramic green sheet 20 to second side surface 14 of each of the plurality of multilayer chips 10 collectively. FIG. 10 is a schematic view showing the plurality of multilayer chips after the second sticking step is performed to stick the side ceramic green sheet to the second side surface of each of the plurality of multilayer chips collectively.

The second sticking step to stick side ceramic green sheet 20 to second side surfaces 14 of the plurality of multilayer chips 10 collectively will not be described as it is similar to the first sticking step to stick side ceramic green sheet 20 to first side surfaces 13 of the plurality of multilayer chips 10 collectively, as described above, that is, side ceramic green sheet 20 that will serve as second side margin portion S2 is stuck to second side surfaces 14 of the plurality of multilayer chips 10 collectively after side ceramic green sheet 20 is stuck to first side surfaces 13 of the plurality of multilayer chips.

As shown in FIG. 10, side ceramic green sheet 20 (more specifically, punched portion 21 of side ceramic green sheet 20) is stuck to each of second side surfaces 14 of the plurality of multilayer chips 10 while the plurality of multilayer chips 10 are held by expandable sheet 31 through adhesion. Further, a portion of each of first and second end surfaces 15 and 16 adjacent to second side surface 14 is covered with burred portion 23.

Multilayer chip 10 with side ceramic green sheet 20 stuck thereto is heated to sinter a ceramic material, and subsequently barrel-finished to form multilayer body 110.

A conductive paste is applied to each of first and second end surfaces 115 and 116 of multilayer body 110 to form a metal layer which is in turn baked and thereafter plated with Ni followed by Sn to form first and second external electrodes 120 and 130.

Multilayer ceramic capacitor 100 according to the present example embodiment can be manufactured through the series of steps described above.

In multilayer ceramic capacitor 100 according to the present example embodiment, multilayer body 110 further includes extended dielectric portions S1E and S2E extending from at least one of first and second side margin portions S1 and S2 so as to cover only a portion of inner layer portion C at at least one of first and second end surfaces 115 and 116. This can increase in length a shortest path through which moisture intruding from the interface between first and second side margin portions S1 and S2 that are a dielectric laterally sandwiching the plurality of internal electrode layers 150 and first and second external electrodes 120 and 130 reaches internal electrode layers 150, and thus reduce or prevent a reduction in moisture resistance of multilayer ceramic capacitor 100.

In multilayer ceramic capacitor 100 according to the present example embodiment, the plurality of internal electrode layers 150 have a maximum offset amount of, for example, about 5 μm or less in widthwise direction W. This ensures that first and second internal electrode layers 151 and 152 have large opposing portions 151C and 152C, respectively, to provide increased capacitance.

In multilayer ceramic capacitor 100 according to the present example embodiment, at an end portion thereof in lengthwise direction L, the plurality of internal electrode layers 150 increase in width from an end portion thereof in layer stacking direction T toward a central portion thereof in layer stacking direction T. This can increase in length a shortest path through which moisture intruding from the interface between first and second side margin portions S1 and S2 and first and second external electrodes 120 and 130 reaches internal electrode layer 150 located at the end portion in layer stacking direction T, and thus suppress reduction in moisture resistance of multilayer ceramic capacitor 100.

In multilayer ceramic capacitor 100 according to the present example embodiment, extended dielectric portions S1E and S2E are located at least at a central portion in layer stacking direction T. This can increase in length a shortest path through which moisture intruding from the interface between first and second side margin portions S1 and S2 and first and second external electrodes 120 and 130 reaches internal electrode layer 150 located at the central portion in layer stacking direction T and being large in width, and thus suppress reduction in moisture resistance of multilayer ceramic capacitor 100.

In multilayer ceramic capacitor 100 according to the present example embodiment, at least one of, for example, Si and Mg segregates in the plurality of internal electrode layers 150 at a portion covered at at least one of first and second end surfaces 115 and 116 with extended dielectric portions S1E and S2E. If those portions of the end portions in widthwise direction W of internal electrode layers 150 adjacent to one another in layer stacking direction T which are covered with extended dielectric portions S1E and S2E should be close to one another, a short circuit caused as the end portions come into contact with one another can be prevented as the portion having segregation of at least one of Si and Mg has improved insulation. As a result, multilayer ceramic capacitor 100 can be enhanced in reliability.

It will be understood by those skilled in the art that the example embodiments described above are specific examples of the following aspects.

<1>

A multilayer ceramic capacitor comprising:

a multilayer body including a plurality of dielectric layers and a plurality of internal electrode layers alternately stacked in a layer stacking direction, and including a first major surface and a second major surface opposite to each other in the layer stacking direction, a first side surface and a second side surface opposite to each other in a widthwise direction orthogonal to the layer stacking direction, and a first end surface and a second end surface opposite to each other in a lengthwise direction orthogonal to both the layer stacking direction and the widthwise direction;

a first external electrode provided on the first end surface; and a second external electrode provided on the second end surface;

wherein the plurality of internal electrode layers including a first internal electrode layer connected to the first external electrode and a second internal electrode layer connected to the second external electrode, the multilayer body including an inner layer portion in which the first and second internal electrode layers have portions, respectively, opposing each other and stacked in the layer stacking direction to produce a capacitance, a first outer layer portion located on a side of the inner layer portion adjacent to the first major surface in the layer stacking direction, a second outer layer portion located on a side of the inner layer portion adjacent to the second major surface in the layer stacking direction, a first side margin portion located on a side of the inner layer portion adjacent to the first side surface in the widthwise direction, and a second side margin portion located on a side of the inner layer portion adjacent to the second side surface in the widthwise direction, and the multilayer body further including an extended dielectric portion extending from at least one of the first and second side margin portions so as to cover only a portion of the inner layer portion at at least one of the first and second end surfaces.

<2>

The multilayer ceramic capacitor according to <1>, wherein the plurality of internal electrode layers have a maximum offset amount of about 5 μm or less in the widthwise direction.

<3>

The multilayer ceramic capacitor according to <1> or <2>, wherein at an end portion thereof in the lengthwise direction, the plurality of internal electrode layers increase in width from an end portion thereof in the layer stacking direction toward a central portion thereof in the layer stacking direction.

<4>

The multilayer ceramic capacitor according to <3>, wherein the extended dielectric portion is located at least at the central portion in the layer stacking direction.

<5>

The multilayer ceramic capacitor according to any one of <1> to <4>, wherein at least one of Si and Mg segregates in the plurality of internal electrode layers at a portion covered at at least one of the first and second end surfaces with the extended dielectric portion.

<6>

The multilayer ceramic capacitor according to any one of <1> to <5>, wherein the multilayer body includes rounded corners and ridges, the corners being portions where three surfaces of the multilayer body meet, and the ridges being portions where two surfaces of multilayer body meet.

<7>

The multilayer ceramic capacitor according to any one of <1> to <6>, wherein the plurality of dielectric layers have a thickness of about 0.4 μm or more and about 0.8 μm or less in the inner layer portion.

<8>

The multilayer ceramic capacitor according to any one of <1> to <7>, wherein the plurality of internal electrode layers have a thickness of about 0.4 μm or more and about 0.8 μm or less.

<9>

The multilayer ceramic capacitor according to any one of <1> to <8>, wherein the first external electrode and the second external electrode include an underlying electrode layer and a plating layer provided on the underlying electrode layer.

<10>

The multilayer ceramic capacitor according to any one of <9>, wherein the plating layer has a two-layer structure in which a Sn plating layer is formed on a Ni plating layer.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers and a plurality of internal electrode layers alternately stacked in a layer stacking direction, and including a first major surface and a second major surface opposite to each other in the layer stacking direction, a first side surface and a second side surface opposite to each other in a widthwise direction orthogonal or substantially orthogonal to the layer stacking direction, and a first end surface and a second end surface opposite to each other in a lengthwise direction orthogonal or substantially orthogonal to both the layer stacking direction and the widthwise direction;

a first external electrode on the first end surface; and a second external electrode on the second end surface; wherein the plurality of internal electrode layers include a first internal electrode layer connected to the first external electrode and a second internal electrode layer connected to the second external electrode;

the multilayer body includes an inner layer portion in which the first and second internal electrode layers include portions, respectively, opposing each other and stacked in the layer stacking direction to generate a capacitance, a first outer layer portion located on a side of the inner layer portion adjacent to the first major surface in the layer stacking direction, a second outer layer portion located on a side of the inner layer portion adjacent to the second major surface in the layer stacking direction, a first side margin portion located on a side of the inner layer portion adjacent to the first side surface in the widthwise direction, and a second side margin portion located on a side of the inner layer portion adjacent to the second side surface in the widthwise direction;

the multilayer body further includes an extended dielectric portion extending from at least one of the first and second side margin portions to cover only a portion of the inner layer portion at at least one of the first and second end surfaces;

each of the plurality of internal electrode layers has a maximum offset amount of about 5 μm or less in the widthwise direction;

at an end portion thereof in the lengthwise direction, the plurality of internal electrode layers increase in width from an end portion thereof in the layer stacking direction toward a central portion thereof in the layer stacking direction; and the extended dielectric portion is located at least at the central portion in the layer stacking direction.

2. The multilayer ceramic capacitor according to claim 1, wherein at least one of Si and Mg segregates in the plurality of internal electrode layers at a portion covered at at least one of the first and second end surfaces with the extended dielectric portion.

3. The multilayer ceramic capacitor according to claim 1, wherein the multilayer body includes rounded corners and ridges, the corners being portions where three surfaces of the multilayer body meet, and the ridges being portions where two surfaces of multilayer body meet.

4. The multilayer ceramic capacitor according to claim 1, wherein each of the plurality of dielectric layers has a thickness of about 0.4 μm or more and about 0.8 μm or less in the inner layer portion.

5. The multilayer ceramic capacitor according to claim 1, wherein each of the plurality of internal electrode layers has a thickness of about 0.4 μm or more and about 0.8 μm or less.

6. The multilayer ceramic capacitor according to claim 1, wherein the first external electrode and the second external electrode include an underlying electrode layer and a plating layer on the underlying electrode layer.

7. The multilayer ceramic capacitor according to claim 6, wherein the plating layer has a two-layer structure including a Ni plating layer and a Sn plating layer on a Ni plating layer.

* * * * *